(12) United States Patent
Tucker

(10) Patent No.: US 6,433,703 B1
(45) Date of Patent: Aug. 13, 2002

(54) FISHING REEL SIGNALING DEVICE

(76) Inventor: Thomas L. Tucker, 1130 Willow St., Blytheville, AK (US) 72315

( * ) Notice: Subject to any disclaimer, the term of this patent is extended or adjusted under 35 U.S.C. 154(b) by 0 days.

(21) Appl. No.: 09/851,073

(22) Filed: May 8, 2001

(51) Int. Cl.[7] ................................................. G08B 5/00
(52) U.S. Cl. ................................. 340/815.51; 340/815.5
(58) Field of Search ......................... 340/815.57, 815.5, 340/815.51, 815.55; 43/17, 17.5; 242/223, 224; 362/276, 802

(56) References Cited

U.S. PATENT DOCUMENTS

| | | | |
|---|---|---|---|
| 2,619,559 A | * 11/1952 | Schenkel | ..................... 200/52 |
| 3,882,629 A | 5/1975 | Kaye | |
| 4,023,298 A | 5/1977 | Story | |
| 4,178,712 A | 12/1979 | Williams | |
| 4,317,377 A | * 3/1982 | Wrinkle | ................... 73/862.42 |
| 4,384,425 A | * 5/1983 | Lemons, Sr. | ................... 43/17 |
| 4,586,284 A | * 5/1986 | Westwood, III | ............... 43/17 |
| 4,590,701 A | * 5/1986 | Rivers | ........................... 43/17 |
| 4,650,161 A | 3/1987 | Kaneko | |
| 5,182,873 A | * 2/1993 | Aragon, Jr. | .................... 43/17 |
| 5,199,665 A | 4/1993 | Tipton | |
| 5,321,903 A | 6/1994 | Ebener | |
| 5,357,410 A | 10/1994 | Cota et al. | |
| 5,458,296 A | * 10/1995 | Kaneko | ...................... 242/232 |
| 5,524,831 A | 6/1996 | Carlson | |
| 5,738,433 A | 4/1998 | Sparks | |
| 6,056,218 A | 5/2000 | Nanbu | |

* cited by examiner

Primary Examiner—Jeffery Hofsass
Assistant Examiner—Son Tang
(74) Attorney, Agent, or Firm—Dale J. Ream

(57) ABSTRACT

A signaling device includes a housing that may be releasably coupled to a fishing reel. The housing includes a transparent front wall defining an opening for receiving a fishing line of the reel therethrough. An incandescent light, battery, and light sensor are positioned within the housing. The light sensor permits current from the battery to energize the light when the level of ambient light is less than a predetermined level. A switch assembly is positioned in the housing and includes an arm pivotally mounted for teetering movement, the arm having a first arm with an eyelet through which the fishing line may extend and a second end adjacent to the battery. Changes in line tension at the first end causes the second end of the arm to move away from or toward the battery. Contact with the battery permits current to energize the light sensor and thus the light.

19 Claims, 4 Drawing Sheets

FISHING REEL SIGNALING DEVICE

BACKGROUND OF THE INVENTION

This invention relates generally to signal devices and, more particularly, to an audible and visual signaling device for a fishing reel which provides the appropriate signal indicative of a fish on a fishing line depending on available ambient light.

Avid fisherman may use several fishing poles at the same time and attempt to monitor each one simultaneously as to whether a fish is nibbling on the bait or has taken the bait and is running with the line. This can be difficult even in the daylight and is certainly more difficult at night. Various devices have been proposed in the art for signaling a fisherman that a fish is on the line. Although assumably effective for their intended purposes, existing devices do not provide an appropriate alarm depending on available ambient light.

Therefore, it is desirable to have a signaling device which attaches directly to a fishing reel that energizes a signal light only when the available ambient light is less than a predetermined level. Further, it is desirable to have a signaling device that energizes an appropriate alarm when the tension on the fishing line is greater than a predetermined tension. Finally, it is desirable to have a signaling device in which the tension required to activate a signal is adjustable by a user.

SUMMARY OF THE INVENTION

A signaling device according to the present invention includes a conical housing having a rear edge adapted to be releasably coupled to a reel of the type having a body portion attachable to a fishing rod, a spool, and means for winding and unwinding a fishing line relative to the spool. The housing defines an open back such that the spool of the reel is received in a back portion of the housing when the housing is coupled to the reel. An incandescent light, a battery power source, and a photoelectric light sensor are mounted within the housing. The front wall of the housing is constructed of a transparent material and defines an opening for receiving the fishing line therethrough. The light sensor permits current from the battery to energize the incandescent light when the level of ambient light is below a predetermined level.

A switch assembly is also mounted within the housing and includes an arm pivotally mounted therein for teetering movement. The arm includes a first end adapted to be coupled to said fishing line and a second end positioned adjacent to the battery. A change in the tension of the fishing line at the first end of the arm causes corresponding movement of the second end of the arm toward or away from the battery. Contact between the second end of the arm and the battery permits current from the battery to energize the light sensor, and thus the incandescent light. The amount of tension increase necessary to activate the light may be adjusted by a user via knob controls coupled to a pair of springs adjacent the second end of the arm. An audible alarm is also positioned in the housing and electrically connected to the light sensor such that current from the battery is permitted to energize the audible alarm upon an appropriate line tension change regardless of the level of ambient light.

Therefore, a general object of this invention is to provide a device for signaling a fisherman when a fish is on the line.

Another object of this invention is to provide a signaling device, as aforesaid, which visually or audibly signals a fisherman during the day or night.

Still another object of this invention is to provide a signaling device, as aforesaid, which energizes an incandescent light signal in response to detecting a fish on the line only at night.

Yet another object of this invention is to provide a signaling device, as aforesaid, which energizes an audible alarm in response to detecting a fish on the line during the day or night.

A further object of this invention is to provide a signaling device, as aforesaid, which permits an alarm to be energized when a predetermined tension on the fishing line is detected.

A still further object of this invention is to provide a signaling device, as aforesaid, in which the alarm activation tension is adjustable by a user.

Another object of this invention is to provide a signaling device, as aforesaid, which includes a photoelectric light sensor for determining whether the light alarm should be energized.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
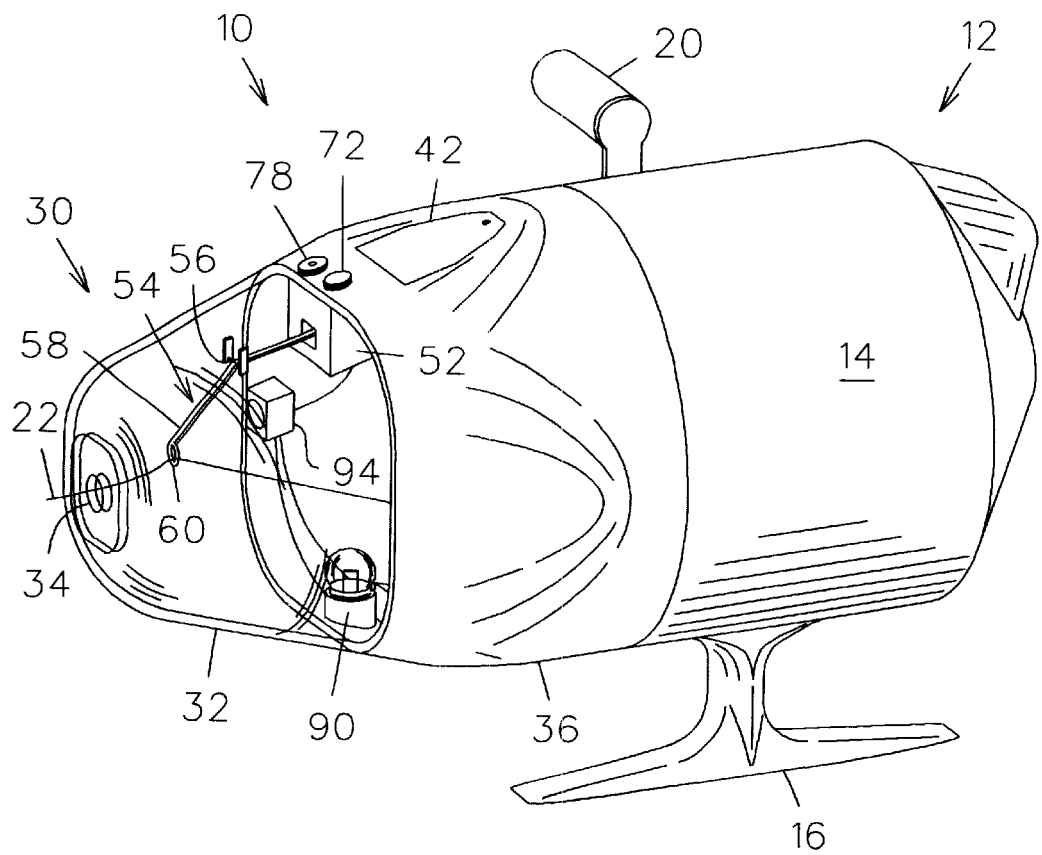
FIG. 1 is a perspective view of a signaling device according to the preferred embodiment of the present invention attached to a fishing reel.

A signaling device 10 for use with a fishing reel 12 according to a preferred embodiment of the present invention will now be described with reference to FIGS. 1 through 4 of the accompanying drawings. The signaling device 10 includes a housing 30 having a conical configuration, the housing having a front wall section 32 and a rear wall section 36 (FIG. 1). The signaling device 10 may be releasably coupled to a conventional fishing reel 12 having a body portion 14 with a flange 16 suitable for attachment to a fishing rod. Preferably, the reel 12 includes a spool 18 pivotally coupled to the body portion 14 in an open spool configuration (FIG. 2) although reels having an enclosed spool are also suitable for use with the present signaling device 10. The reel 12 also includes a conventional crank handle 20 connected to the spool 18 for winding a fishing line 22 thereabout in order to retrieve the fishing line or for unwinding the line in order to pay out the line.

The housing 30 includes a rear edge 38 that defines an open back (FIG. 2) and which may be releasably coupled to the body portion 14 of the fishing reel 12 in a friction fit arrangement (FIG. 1). The spool 18 of an open-spool reel configuration is received through the open back into the housing 30. It should be understood that the housing 30 may also be particularly constructed for use with a particularly designed fishing reel such that the housing and reel could be releasably joined in a threaded or snap-fit arrangement.

The front wall section 32 of the housing 30 is constructed of a transparent or at least translucent plastic material. The front wall section 32 defines an opening 34 dimensioned to allow a fishing line 22 wrapped about the spool 18 to pass therethrough.

Figure 3:
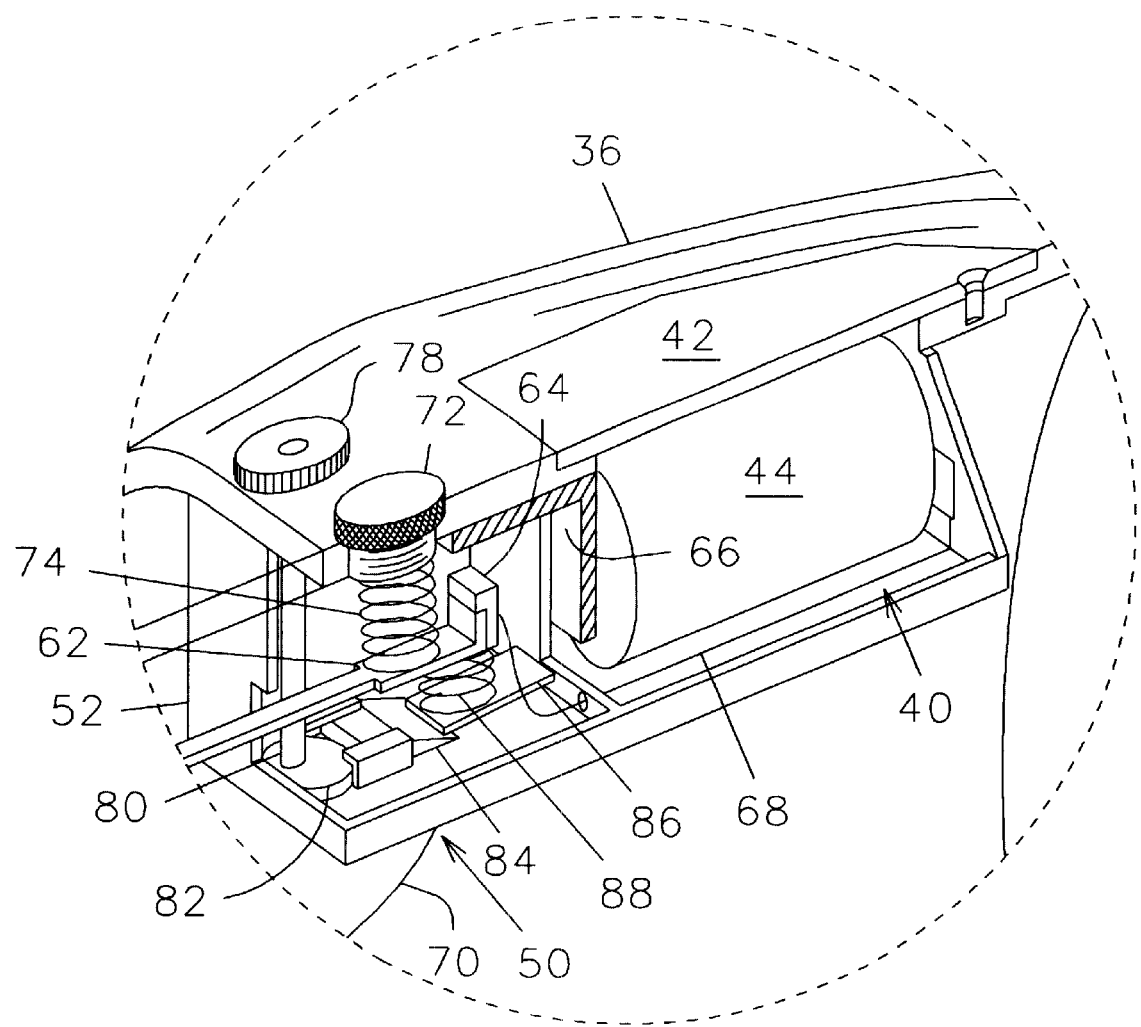
FIG. 3 is an isolated perspective view of the switch assembly portion of the housing as in FIG. 2 on an enlarged scale in one adjusted configuration.

The housing 30 includes a battery compartment 40 depending from the rear wall section 36 (FIG. 3). The battery compartment 40 is accessible through a cover member 42 releasably coupled thereto. A battery 44 is the preferred power source for the components to be described below and may be removably housed within the battery compartment 40.

A switch assembly 50 is mounted to the inner surface of the rear wall section 36 of the housing 30 and includes an arm 54 pivotally mounted therein for teetering movement about an axial fulcrum 56 (FIG. 1). The arm 54 includes a first end 58 having an eyelet 60 for receiving the fishing line 22 therethrough as it passes between the opening 34 and the spool 18 of the reel 12. The arm 54 includes an opposed second end 62 positioned adjacent the battery 44 (FIG. 3). More particularly, the second end 62 is adjacent an electrical contact plate 66 that bears against one of the battery terminals. An electrical contact member 64 is fixedly attached to the second end 62 and is electrically connected to the other battery terminal with a wire 68 such that a circuit is closed when the electrical contact member 64 contacts the electrical contact plate 66. The switch assembly 50 is electrically connected to the light sensor 94 with a wire 70 (FIG. 3), as to be described more fully below.

The arm 54 is teetered about the fulcrum 56 according to the tension on the fishing line 22 at the first end 58. In general, as tension on the line 22 pulls the first end 58 downward, the second end 62 is correspondingly urged upward toward the electrical contact plate 66. The position of the second end 62 and the resistance placed against its movement toward the contact plate 66 is regulated by springs coupled to adjustment knobs and positioned within a switch housing 52 (FIG. 3). A first knob 72 is threadably coupled to the housing 30. A first compression spring 74 is fixedly attached to the first knob 72 and includes a free end extending from the first knob 72 toward the second end 62 of the arm 54. Therefore, a rotation of the first knob 72 causes the first spring 74 either to move closer to the second end 62 or further away from it, respectively, and thus to affect the resistance against the 20 second end 62 as it is urged toward the battery contact plate 66.

The switch assembly 50 includes a second adjustment knob 78 (FIG. 3) coupled to a shaft 80 that extends through the rear wall section 36 and into the switch housing 52. The end of the shaft 80 opposite the second knob 78 is fixedly attached to an obround plate commonly known as an eccentric 82. A spring-biased ramp 84 is mounted within the switch housing 52 and normally bears against the eccentric 82 such that rotation of the second knob 78 and corresponding movement of the eccentric 82 causes lateral movement of the ramp 84. A mounting plate 86 is also positioned in the switch housing 52 in contact with the ramp 84 such that the mounting plate 86 is raised or lowered upon corresponding movement of the ramp 84. A second spring-88 is mounted atop the mounting plate 86 and extends upwardly so as to contact the second end 62 of the arm 54. Therefore, adjustment of the second knob 78 allows a user to initially regulate the distance between the second end 62 and the contact plate 66 and thus how much of a line tensional change will be needed to energize an alarm.

Figure 2:
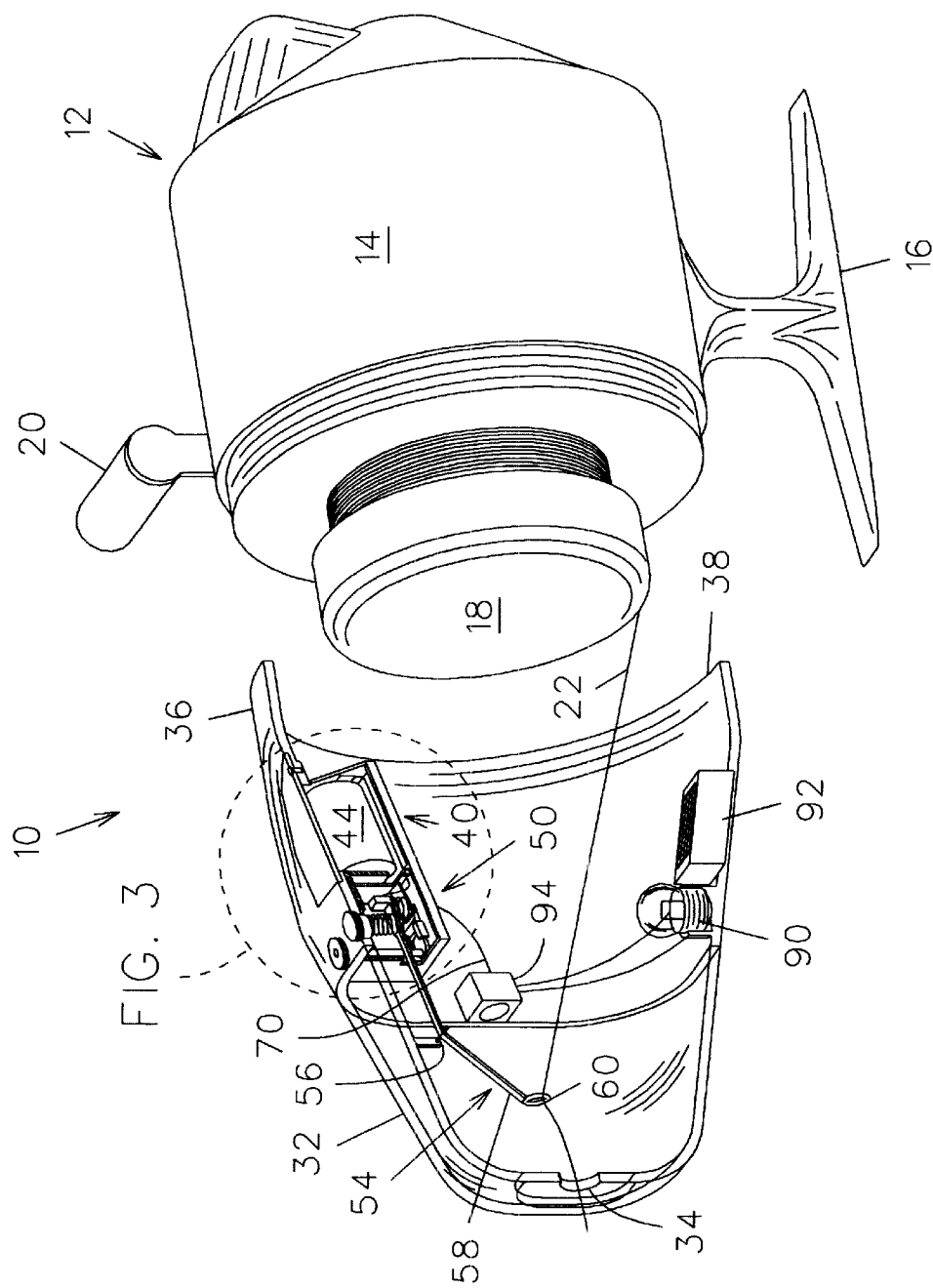
FIG. 2 is a fragmentary view of the housing as in FIG. 1 removed from the reel.

An incandescent light 90 and an audible alarm 92 such as a piezo buzzer are mounted on an inner surface of the rear wall section 36 of the housing 30 (FIG. 2). A photoelectric light sensor 94 is also mounted in the housing 30 and is positioned to sense the level of ambient light entering the housing through the front wall section (FIGS. 1 and 2). The switch assembly 50 is electrically connected to the light sensor 94 as are the light 90 and audible alarm 92 (FIG. 2). Using conventional electrical components within the light sensor 94, the light sensor 94 permits current from the battery 44 to energize the audible alarm 92 when the light sensor 94 itself has been energized. Further, the light sensor 94 permits current from the battery 44 to energize the incandescent light 90 when the light sensor 94 itself has been energized and if the level of ambient light sensed by the light sensor 94 is less than a predetermined level. The light sensor 94 is able to determine an ambient light level from the light entering the housing 30 through the transparent front wall section 32.

In use, the housing 30 may be coupled to a reel 12 that is attached to a fishing pole such that the spool 18, or front portion of the reel if the spool is enclosed therein, is received through the open back of the housing 30. The fishing line 22 is threaded through the eyelet 60 at the first end 58 of the switch assembly arm 54 and then through the front wall section opening 34 (FIG. 1). When fishing, the tension of the fishing line will increase when a fish nibbles on the bait or takes the bait entirely and runs with the line. Such a tension change causes a downward pull on the first end 58 of the arm 54 and a corresponding upward movement on the second end 62. When the electrical contact member 64 of the second end 62 contacts the contact plate 66, an electrical circuit with the battery 44 is closed and the light sensor 94 is energized. This allows the audible alarm 92 to be energized as well, but only if the level of ambient light is below a predetermined level, allows the light 90 to be energized as well.

Figure 4:
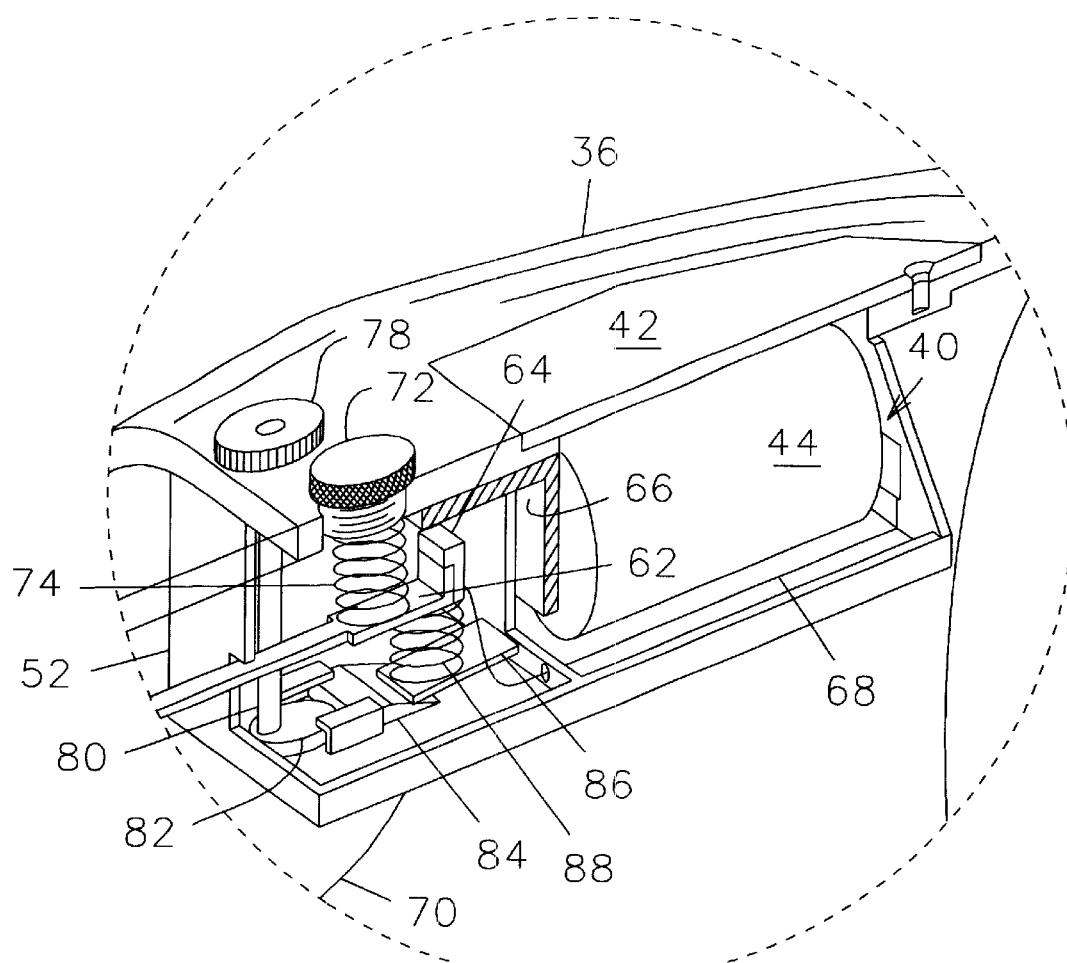
FIG. 4 is an isolated perspective view of the switch assembly portion of the housing as in FIG. 2 on an enlarged scale in another adjusted configuration.

The first 72 and second 78 adjustment knobs may be rotated to increase or decrease the amount of tension that is required to trigger the alarms. The first knob 72 may be adjusted to increase or decrease the spring resistance that must be overcome by the second end 62 of the arm 54 in order to contact the contact plate 66. The second knob 78 may be rotated to increase or decrease the distance that the second end 62 must travel before contacting the contact plate 66 (FIGS. 3 and 4).

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A signaling device for use with a fishing reel having a body portion and a spool mounted to said body portion having means for winding a fishing line onto said spool and means for unwinding said fishing line therefrom, said signaling device comprising:

a housing having a rear edge adapted to be releasably coupled to said body portion of said reel and defining an open back, said housing having a front wall defining an opening for receiving said fishing line therethrough;

an incandescent light positioned in said housing;

a power source;

a light sensor positioned in said housing for sensing the level of ambient light therein, said light sensor permitting current from said power source to energize said incandescent light when the level of ambient light is less than a predetermined level; and a switch assembly having an arm pivotally mounted in said housing for teetering movement therein, said arm having a first end adapted to be coupled to said fishing line and a second end positioned adjacent said power source for permitting current from said power source to energize said light sensor when the tension of said fishing line is greater than a predetermined level.

2. The signaling device as in claim 1 wherein said switch assembly comprises:
   a first spring adjustably positioned in said housing for selectively resisting movement of said second end of said arm toward said power source; and
   a second spring adjustably positioned in said housing for selectively positioning said second end of said arm relative to said power source, said second end of said arm having a conductive element attached thereto and electrically connected to said light sensor for energizing said light sensor upon contact with said power source.

3. The signaling device as in claim 2 further comprising:
   a first knob threadably coupled to said housing and fixedly attached to said first spring such that rotation of said first knob regulates the distance between said first spring and said second end of said arm; and
   a second knob threadably coupled to said housing and coupled to said second spring such that a respective rotation of said second knob causes said second spring to urge said second end of said arm toward or away from said power source.

4. The signaling device as in claim 1 wherein said first end of said arm includes an eyelet through which said fishing line may extend such that a tension change relative to said fishing line indicative of a fish thereon causes a corresponding pivotal movement of said arm.

5. The signaling device as in claim 1 further comprising an audible alarm positioned in said housing and electrically connected to said light sensor, said light sensor permitting current from said power source to energize said audible alarm.

6. The signaling device as in claim 1 wherein said power source is a battery.

7. The signaling device as in claim 1 wherein said housing includes a compartment for holding said power source, said compartment having a cover member releasably coupled thereto.

8. The signaling device as in claim 1 wherein a front portion of said housing is constructed of a transparent material.

9. A signaling device for use with a fishing reel having a spool and means for winding a fishing line onto said spool and means for unwinding said fishing line therefrom, said signaling device comprising:
   housing having a rear edge adapted to be releasably coupled to said reel and defining an open back, said housing having a transparent front wall defining an opening for receiving said fishing line therethrough;
   an audible alarm positioned in said housing;
   an incandescent light positioned in said housing;
   a battery;
   a light sensor positioned in said housing for sensing the level of ambient light therein, said light sensor permitting current from said battery to energize said incandescent light when the level of ambient light is less than a predetermined level;
   a switch assembly having an arm pivotally mounted in said housing for teetering movement therein, said and having a first end adapted to be coupled to said fishing line and a second end positioned adjacent said battery, wherein said arm is pivotal upon a change in the tension of said fishing line between a first configuration in which said second end is displaced from said battery and a second configuration in which said second end is in contact with said battery;
   means for selecting an amount of tension that must be placed upon said fishing line at said first end to move said second end to said second configuration; and
   a conductive element attached to said second end of said arm and electrically coupled to said audible alarm for energizing said audible alarm at said second configuration.

10. The signaling device as in claim 9 wherein said switch assembly further comprises:
    a first spring adjustably positioned in said housing for selectively resisting movement of said second end of said arm toward said power source; and
    a second spring adjustably positioned in said housing for selectively positioning said second end of said arm relative to said power source.

11. The signaling device as in claim 10 wherein said selecting means comprises:
    a first knob threadably coupled to said housing and fixedly attached to said first spring such that rotation of said first knob regulates the distance between said first spring and said second end of said arm; and
    a second knob threadably coupled to said housing and coupled to said second spring such that a respective rotation of said second knob causes said second spring to urge said second end of said arm toward or away from said battery.

12. The signaling device as in claim 9 wherein said first end of said arm includes an eyelet through which said fishing line may extend such that a tension change relative to said fishing line indicative of a fish thereon causes a corresponding pivotal movement of said arm.

13. The signaling device as in claim 9 wherein said housing includes a compartment for holding said battery, said compartment having a cover member releasably coupled thereto.

14. A fishing reel signaling device, comprising:
    a fishing reel having a body portion adapted to be attached to a fishing pole, said fishing reel having a spool attached to said body portion;
    means on said fishing reel for winding a fishing line onto said spool in order to retrieve said fishing line and means for unwinding said fishing line from said spool in order to pay out said fishing line;
    a housing having a rear edge adapted to be releasably coupled to said body portion of said reel and defining an open back, said housing having a transparent front wall defining an opening for receiving said fishing line therethrough;
    an incandescent light positioned in said housing;
    a battery;
    a light sensor positioned in said housing for sensing the level of ambient light therein, said light sensor permitting current from said battery to energize said incandescent light when the level of ambient light is less than a predetermined level; and
    a switch assembly having an arm pivotally mounted in said housing and adapted for teetering movement therein, said arm having a first end adapted to be coupled to said fishing line and a second end positioned adjacent said battery for permitting current from said battery to energize said light sensor when the tension of said fishing line is greater than a predetermined level.

15. The apparatus as in claim 14 wherein said switch assembly comprises:

a first spring adjustably positioned in said housing for selectively resisting movement of said second end of said arm toward said power source; and a second spring adjustably positioned in said housing for selectively positioning said second end of said arm relative to said power source, said second end of said arm having a conductive element attached thereto and electrically connected to said light sensor for energizing said light sensor upon contact with said power source.

16. The signaling device as in claim 15 further comprising:

a first knob threadably coupled to said housing and fixedly attached to said first spring such that rotation of said first knob regulates the distance between said first spring and said second end of said arm; and a second knob threadably coupled to said housing and coupled to said second spring such that a respective rotation of said second knob causes said second spring to urge said second end of said arm toward or away from said power source.

17. The signaling device as in claim 14 wherein said first end of said arm includes an eyelet through which said fishing line may extend such that a tension change relative to said fishing line indicative of a fish thereon causes a corresponding pivotal movement of said arm.

18. The signaling device as in claim 14 further comprising an audible alarm positioned in said housing and electrically connected to said light sensor, said light sensor permitting current from said power source to energize said audible alarm.

19. The signaling device as in claim 14 wherein said housing includes a compartment for holding said battery, said compartment having a cover member releasably coupled thereto.

* * * * *

UNITED STATES PATENT AND TRADEMARK OFFICE
CERTIFICATE OF CORRECTION

PATENT NO.   : 6,433,703 B1
DATED        : August 13, 2002
INVENTOR(S)  : Thomas L. Tucker It is certified that error appears in the above-identified patent and that said Letters Patent is hereby corrected as shown below:

<u>Title page,</u>
Item [76], inventor's address, change "AK" into -- AR --.

Signed and Sealed this

Twenty-first Day of January, 2003

JAMES E. ROGAN
*Director of the United States Patent and Trademark Office*